(12) United States Patent
Kaing et al.

(10) Patent No.: US 12,119,628 B2
(45) Date of Patent: Oct. 15, 2024

(54) FLEXIBLE, WATER REPELLANT, HIGH TEMPERATURE RESISTANT, WRAPPABLE SLEEVE AND METHOD OF CONSTRUCTION THEREOF

(71) Applicant: Federal-Mogul Powertrain LLC, Southfield, MI (US)

(72) Inventors: Alice Kaing, Margny-les-Compiegne (FR); Amelie Simoens, Compiegne (FR); Julien Deltor, Gennevilliers (FR); Nandor Gyurta, Crepy en Valois (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 210 days.

(21) Appl. No.: 17/642,333

(22) PCT Filed: Sep. 16, 2020

(86) PCT No.: PCT/US2020/050936
§ 371 (c)(1),
(2) Date: Mar. 11, 2022

(87) PCT Pub. No.: WO2021/055381
PCT Pub. Date: Mar. 25, 2021

(65) Prior Publication Data
US 2022/0333279 A1    Oct. 20, 2022

Related U.S. Application Data

(60) Provisional application No. 62/901,703, filed on Sep. 17, 2019.

(51) Int. Cl.
*H02G 3/00*    (2006.01)
*D03D 1/00*    (2006.01)
(Continued)

(52) U.S. Cl.
CPC ......... *H02G 3/0481* (2013.01); *D03D 1/0041* (2013.01); *D03D 1/0043* (2021.05);
(Continued)

(58) Field of Classification Search
None
See application file for complete search history.

(56) References Cited

U.S. PATENT DOCUMENTS 3,594,873 A    7/1971    Hockmeyer et al.
4,281,211 A    7/1981    Tatum et al.
(Continued)

FOREIGN PATENT DOCUMENTS

| DE | 102011086191 A1 | 3/2013 |
| DE | 102016110608 A1 | 12/2017 |
| EP | 0886358 A3 | 6/1998 |

*Primary Examiner* — Alexander S Thomas
(74) *Attorney, Agent, or Firm* — Robert L. Stearns; Dickinson Wright PLLC

(57) ABSTRACT

A textile sleeve for routing and protecting an elongate member and method of construction thereof are provided. The sleeve has a wall with opposite edges extending lengthwise between opposite ends. The edges are configured to be wrapped about a central longitudinal axis to bound the elongate member within an enclosed cavity. The wall is formed of interlaced heat-resistant yarn with at least one hook-type fastener member along one of the edges and at least one loop-type fastener member along the other of the edges. The hook-type fastener member and the loop-type fastener member are configured to attach with one another to maintain the opposite edges in releasably fixed, overlapping relation with one another.

10 Claims, 3 Drawing Sheets

(51) Int. Cl.
*D03D 15/267* (2021.01)
*D03D 15/513* (2021.01)
*H02G 3/04* (2006.01)

(52) U.S. Cl.
CPC ......... *D03D 15/267* (2021.01); *D03D 15/513* (2021.01); *D10B 2101/06* (2013.01); *H02G 3/0412* (2013.01); *Y10T 428/24008* (2015.01); *Y10T 428/24017* (2015.01)

(56) References Cited

U.S. PATENT DOCUMENTS

| | | | |
|---|---|---|---|
| 5,076,288 A * | 12/1991 | Millard | A61F 5/3776 |
| | | | 128/869 |
| 6,328,080 B1 | 12/2001 | Winters | |
| 6,774,312 B2 | 8/2004 | Fatato | |
| 6,991,843 B2 * | 1/2006 | Armela | B29C 43/46 |
| | | | 428/120 |
| 7,085,458 B2 * | 8/2006 | Morris | F16L 11/125 |
| | | | 385/109 |
| 7,216,678 B2 | 5/2007 | Baer | |
| 7,576,286 B2 | 8/2009 | Chen | |
| 8,367,182 B2 | 2/2013 | Rodrigues et al. | |
| 9,055,772 B2 | 6/2015 | Stinson et al. | |
| 9,548,596 B2 | 1/2017 | Avula et al. | |
| 9,695,962 B2 | 6/2017 | Chen | |
| 10,711,921 B2 * | 7/2020 | Barger | H02G 3/32 |
| 2002/0170728 A1 | 11/2002 | Holland et al. | |
| 2005/0081343 A1 * | 4/2005 | Clarner | A44B 18/0061 |
| | | | 24/452 |
| 2010/0108171 A1 | 5/2010 | Relats Manent et al. | |
| 2018/0023222 A1 | 1/2018 | Zhang et al. | |

* cited by examiner

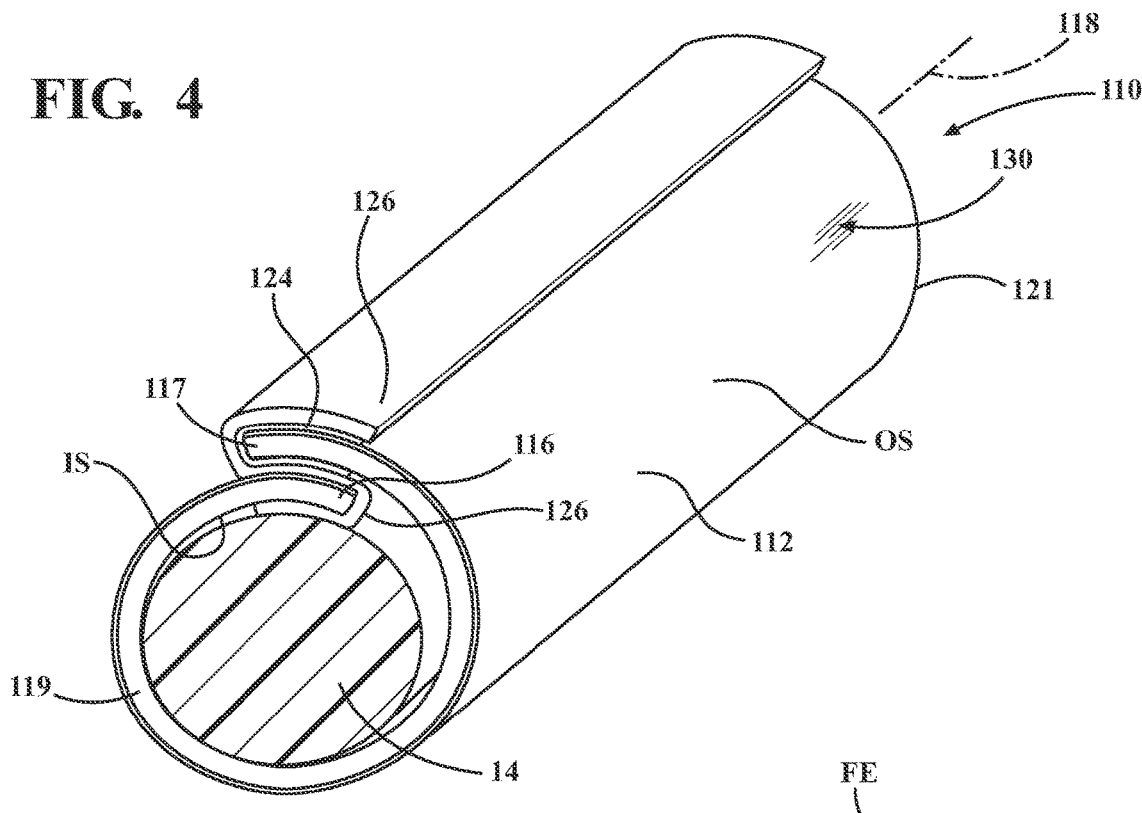
FIG. 4
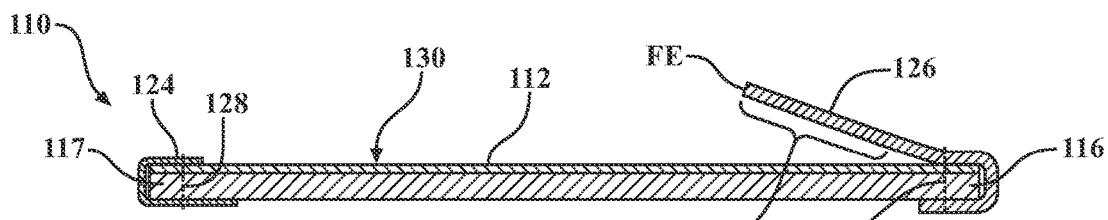
FIG. 5A
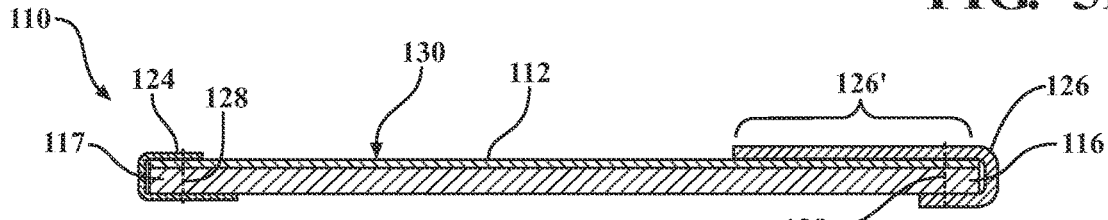
FIG. 5B
FIG. 5C

FLEXIBLE, WATER REPELLANT, HIGH TEMPERATURE RESISTANT, WRAPPABLE SLEEVE AND METHOD OF CONSTRUCTION THEREOF

CROSS-REFERENCE TO RELATED APPLICATION

This U.S. Utility Patent Application claims the benefit of International Patent Application No. PCTUS2020/050936, filed Sep. 16, 2020, which claims priority to U.S. Provisional Application Ser. No. 62/901,703, filed Sep. 17, 2019, both of which are incorporated herein by reference in their entirety.

BACKGROUND OF THE INVENTION

1. Technical Field

This invention relates generally to textile sleeves for protecting elongate members, and more particularly to wrappable textile sleeves having water repellant, highly flexible, high temperature resistant properties.

2. Related Art

It is known to contain and protect elongate members, such as wires and wire harnesses, for example, in circumferentially continuous, tubular textile sleeves to provide protection to the wires against abrasion, fluid and thermal affects. However, these sleeves are generally challenging to assemble about elongate members to be protected due to their having a fixed cavity size and to having to be slipped over the elongate member to be protected similarly to that of putting on a sock. Further yet, in order to achieve the multiple types of desired protection, and to ensure optimal protection to the elongate members against the effects of abrasion, known protective sleeves commonly have multiple layers, with some of the layers being specifically provided for different types of protection. For example, one layer may be provided for optical coverage to inhibit seeing through the sleeve, e.g. a sheet of plastic material, while another layer may be provided for abrasion resistance, while yet another layer may be provided for protection against thermal conditions, and yet another layer may be provided to inhibit the ingress of water. Although the aforementioned multilayer sleeves may provide suitable protection against various environmental conditions, unfortunately they are bulky, thereby requiring an increased volume of space, and further, they tend to be relatively heavy and exhibit low flexibility. Further yet, having to include multiple layers can prove problematic in some applications, particularly applications requiring routing cables or hoses through tight, winding areas, as well as applications having weight restrictions, such as aircraft and aerospace applications, for example.

SUMMARY OF THE INVENTION

One aspect of the invention provides a wrappable textile sleeve for routing and protecting an elongate member from exposure to abrasion, thermal conditions including high heat and fire, water ingress, and other environmental conditions, such as contamination. The sleeve has a flexible, abrasion resistant, water repellant, wrappable wall having opposite edges extending lengthwise between opposite ends. The opposite edges are configured to be wrapped about a central longitudinal axis to bound the elongate member within an enclosed cavity. The wall is formed of interlaced heat-resistant yarn and has at least one hook-type fastener member along one of the opposite edges and at least one loop-type fastener member along the other of the opposite edges. The at least one hook-type fastener member and the at least one loop-type fastener member are configured to attach with one another to maintain the opposite edges of the wall in overlapping relation with one another. The at least one hook-type fastener and the at least one loop-type fastener are formed of aramid, thereby further enhance the heat-resistance of the sleeve.

In accordance with another aspect of the invention, the at least one hook-type fastener member and the at least one loop-type fastener member are fixed to the wall with aramid yarn, thereby further enhancing the heat-resistance of the sleeve.

In accordance with another aspect of the invention, the sleeve can further include a silicone coating on an outer surface of the wall to render the wall being water repellant, thereby enhancing the protection provided to the elongate member contained within the cavity of the sleeve.

In accordance with another aspect of the invention, a silicone coating can be provided on the at least one hook-type fastener member and the at least one loop-type fastener member to further enhance the water repellency of the wall.

In accordance with another aspect of the invention, the interlaced heat-resistant yarn can be provided as fiberglass yarn.

In accordance with another aspect of the invention, the interlaced heat-resistant yarns can be woven.

In accordance with another aspect of the invention, the interlaced heat-resistant yarns can be braided.

In accordance with another aspect of the invention, the interlaced heat-resistant yarn can be knit.

In accordance with another aspect of the invention, one of the hook-type fastener and the loop-type fastener is sandwiched between the other of the hook-type fastener and the loop-type fastener, thereby enhancing fixation and watertightness between the opposite inner and outer edges without need of supplemental fixation mechanisms, while allowing the sleeve to be routed about meandering paths, including corners, without having the opposite edges open relative to one another.

In accordance with another aspect of the invention, one of the hook-type fastener and the loop-type fastener is wrapped about one of the opposite edges and the other of the hook-type fastener and the loop-type fastener is wrapped about the other of the opposite edges.

In accordance with another aspect of the invention, the hook-type fastener is wrapped about an outer one of the opposite edges and the loop-type fastener is wrapped about an inner one of the opposite edges.

In accordance with another aspect of the invention, the loop-type fastener has a flap portion detached from the wall, with the flap portion being wrappable about the outer edge into fixed relation with the hook-type fastener.

In accordance with another aspect of the invention, the loop-type fastener is fixed to a portion of the hook-type fastener extending along an inner surface of the wall and to a portion of the hook-type fastener extending along an outer surface of the wall.

In accordance with another aspect of the invention, a method of constructing a textile sleeve is provided. The method includes interlacing heat-resistant yarn to form a wall having opposite edges extending lengthwise between opposite ends, with the opposite edges being configured to be wrapped about a central longitudinal axis to bound the elongate member within an enclosed cavity. Further, fixing at least one heat-resistant hook-type fastener member along one of the opposite edges and at least one heat-resistant loop-type fastener member along the other of the opposite edges, wherein the hook-type fastener member and the loop-type fastener member are configured for releasable attachment to one another.

In accordance with another aspect of the invention, the method can further include providing the hook-type fastener member and the loop-type fastener member being made of aramid.

In accordance with another aspect of the invention, the method can further include attaching the at least one hook-type fastener member and the at least one loop-type fastener member to the wall with aramid yarn, thereby further enhancing the high heat and fire resistance of the sleeve.

In accordance with another aspect of the invention, the method can further include providing a silicone layer coating on an outer surface of the wall to enhance the water repellency of the sleeve.

In accordance with another aspect of the invention, the method can further include providing a silicone coating on the at least one hook-type fastener member and on the at least one loop-type fastener member to further enhance the water repellency of the sleeve.

In accordance with another aspect of the invention, the method can further include providing the interlaced heat-resistant yarn as fiberglass yarn to enhance the heat and fire resistance of the sleeve.

In accordance with another aspect of the invention, the method can further include weaving the heat-resistant yarns to form the wall.

In accordance with another aspect of the invention, the method can further include braiding the heat-resistant yarns to form the wall.

In accordance with another aspect of the invention, the method can further include knitting the heat-resistant yarn to form the wall.

In accordance with another aspect of the invention, the method can further include configuring one of the hook-type fastener and the loop-type fastener to be sandwiched between the other of the hook-type fastener and the loop-type fastener to enhance fixation and water-tightness between the fasteners.

In accordance with another aspect of the invention, the method can further include wrapping one of the hook-type fastener and the loop-type fastener about one of the opposite edges and wrapping the other of the hook-type fastener and the loop-type fastener about the other of the opposite edges.

In accordance with another aspect of the invention, the method can further include wrapping the hook-type fastener about an outer one of the opposite edges and wrapping the loop-type fastener about an inner one of the opposite edges.

In accordance with another aspect of the invention, the method can further include providing the loop-type fastener having a flap portion detached from the wall, with the flap portion being wrappable about the outer edge into fixed relation with the hook-type fastener extending along an outer surface of the wall.

In accordance with another aspect of the invention, the method can further include configuring the loop-type fastener to be fixed to a portion of the hook-type fastener extending along an inner surface of the wall and to a portion of the hook-type fastener extending along an outer surface of the wall.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

FIG. 4 is a perspective view of a sleeve constructed in accordance with another aspect of the disclosure FIGS. 5A-5C are side views of the sleeve of FIG. 4 shown prior to be wrapped into a tubular configuration about an elongate member to be protected.

DETAILED DESCRIPTION OF PREFERRED EMBODIMENTS

Figure 1:
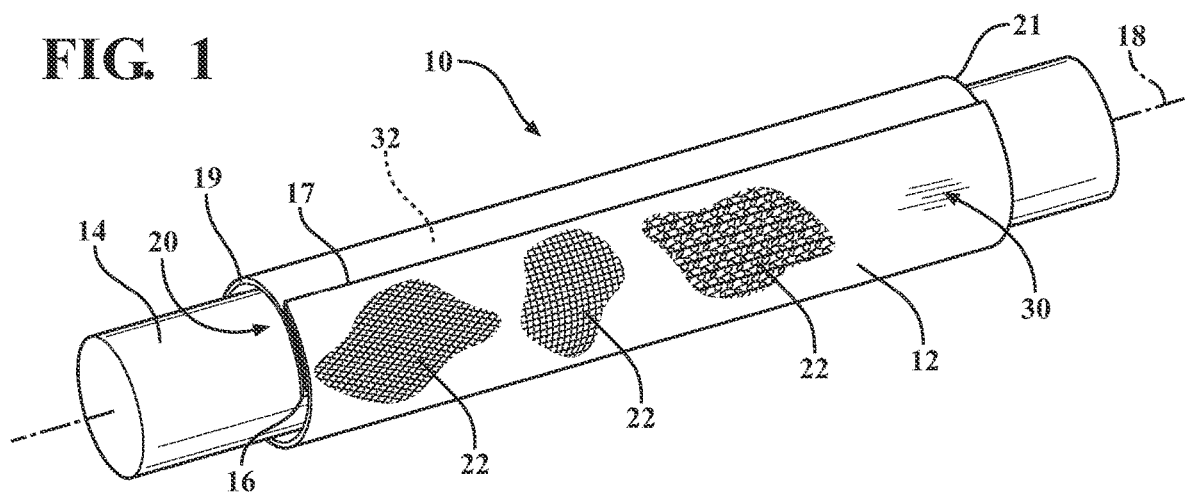
FIG. 1 is schematic perspective view of a self-wrapping sleeve constructed in accordance with one aspect of the invention, with the sleeve shown carrying and protecting an elongate member therein.
Figure 2:
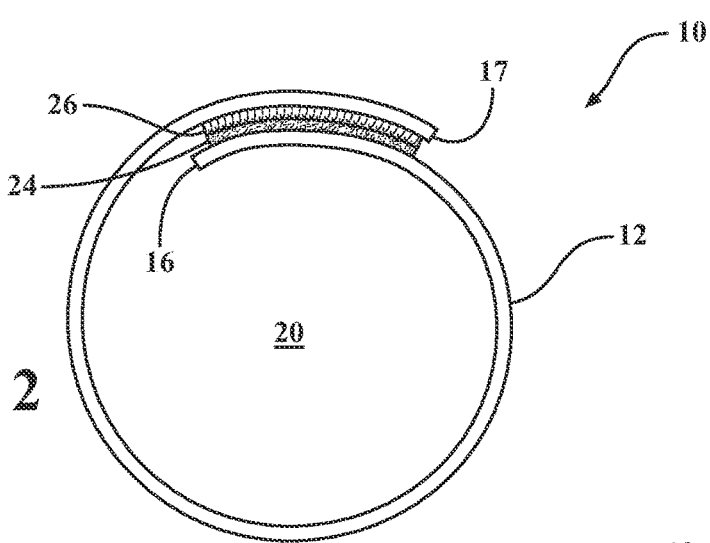
FIG. 2 is an enlarged schematic end view of the sleeve of FIG. 1 illustrating opposite edges of a wall of the sleeve in releasably fixed, overlapping relation with one another.
Figure 3:
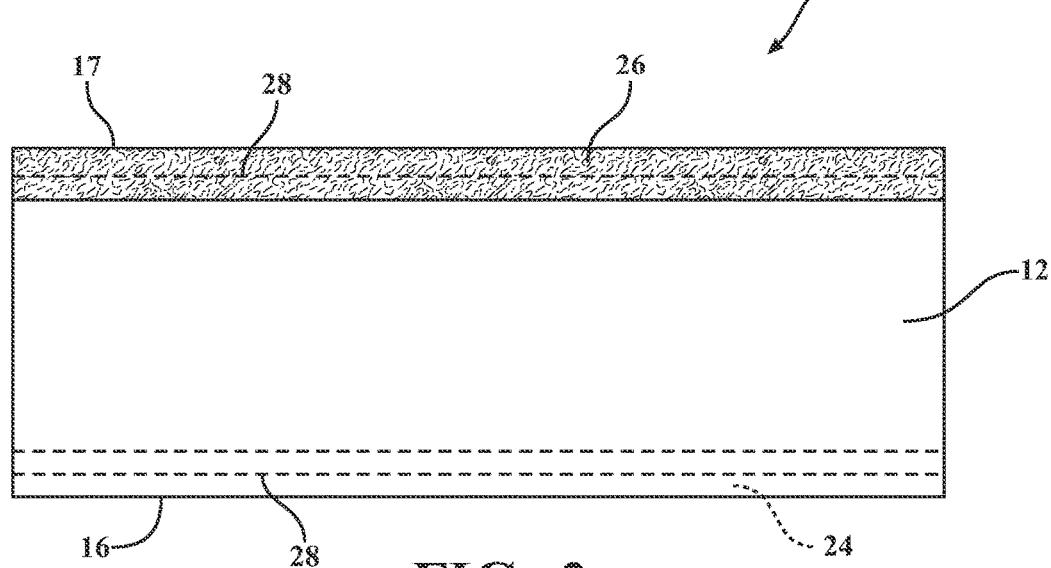
FIG. 3 is a plan view of the wall of the sleeve of FIG. 1 shown prior to be wrapped into a tubular configuration.

Referring in more detail to the drawings, FIGS. 1-3 show a schematic representation of an interlaced, wrappable (shown wrapped in FIG. 1) textile sleeve, referred to hereafter as sleeve 10, constructed in accordance with one aspect of the invention. The sleeve 10 has a wrappable elongate wall 12 for routing and protecting an elongate member(s), such as wires or a wire harness 14, for example, from exposure to abrasion, thermal conditions including high heat and fire, water ingress, and other environmental conditions, such as contamination. The elongate wall 12 has opposite edges 16, 17 extending generally parallel to a central, longitudinal axis 18 between opposite ends 19, 21, wherein the edges 16, 17 are wrappable into overlapping relation with one another in "cigarette wrapped" fashion to fully enclose the elongate members 14 within a central cavity 20 of the sleeve 10. The cavity 20 is readily accessible along the full length of the wall 12, via separation of the opposite edges 16, 17, so that the elongate member(s) 14 can be readily disposed radially, relative the axis 18, into the cavity 20, and conversely, removed from the cavity 20, such as during service. To provide the desired protection to the elongate members 14 against high heat and fire, the wall 12 is formed via interlaced heat-resistant yarn 22, such as fiberglass yarn. Further, the wall 12 is provided having at least one hook-type fastener member 24 along one of the opposite edges 16 and at least one loop-type fastener member 26 along the other of the opposite edges 17, wherein the at least one hook-type fastener member 24 and the at least one loop-type fastener member 26 are configured to for releasable attachment with one another to selectively maintain the opposite edges 16, 17 of the wall 12 in closed, overlapping relation with one another. To enhance the high heat and fire resistance of the sleeve 10, the hook-type fastener member 24 and the loop-type fastener member 26 are formed of aramid.

To provide further protection to the elongate members 14 against high heat and fire, the at least one hook-type fastener member 24 and the loop-type fastener member 26 can be fixed to the wall 12 with aramid yarn 28, such as via stitching the fastener members 24, 26 to the wall 12 with the aramid yarn 28.

To provide further protection to the elongate members 14 against damage from water ingress, the sleeve 10 can further include a water-resistant coating, such as a silicone coating 30, on an outer surface 32 of the wall 12 to render the wall 12 water repellant. Further yet, the silicone coating 30 can be provided on the hook-type fastener member 24 and on the loop-type fastener member 26 to further enhance the water repellency of the wall 12.

Depending on the application needs, the wall 12 can be constructed having any suitable size, including length and diameter. As represented schematically in FIG. 1, the heat and fire-resistant yarn 22 can be woven, braided or knit to form the wall 12. When the wall 12 is in its wrapped tubular configuration, the fastener members 24, 26 maintain the wall 12 in a fixed tubular configuration to fully enclose the elongate member 14 in the cavity 20, and when desired, the edges 16, 17 can be pulled away from one another under an externally applied force sufficient to overcome the attachment force imparted between the fastener members 24, 26. Accordingly, the elongate member 14 can be readily disposed into the cavity 20 during assembly or removed from the cavity 20 during service.

A sleeve 110 constructed in accordance with another aspect of the disclosure is shown in FIG. 4, wherein the same reference numerals, offset by a factor of 100, are used to identify like features. The sleeve 110 is similar to the sleeve 10 of FIG. 1, including having a wrappable elongate wall 112, constructed of the same types of yarns as discussed above for the sleeve 10, for routing and protecting an elongate member(s) 14 from exposure to abrasion, thermal conditions including high heat and fire, water ingress, and other environmental conditions, such as contamination. The elongate wall 112 has opposite edges 116, 117 extending generally parallel to a central, longitudinal axis 118 between opposite ends 119, 121, wherein the edges 116, 117 are wrappable into overlapping relation with one another in "cigarette wrapped" fashion to fully enclose the elongate members 14 within a central cavity 120 of the sleeve 110.

As discussed above for the wall 12, the wall 112 is provided having at least one hook-type fastener, also referred to as hook-type fastener member 124, along one of the opposite edges, shown as the outer edge 117, and at least one loop-type fastener, also referred to as loop-type fastener member 126, along the other of the opposite edges, shown as the inner edge 116, wherein the at least one hook-type fastener member 124 and the at least one loop-type fastener member 126 are configured to for releasable attachment with one another to selectively maintain the opposite edges 116, 117 of the wall 112 in closed, overlapping relation with one another. To enhance the high heat and fire resistance of the sleeve 110, the hook-type fastener member 124 and the loop-type fastener member 126 can be formed of aramid, or some other high heat, flame resistant material, as discussed above.

Figure 6:
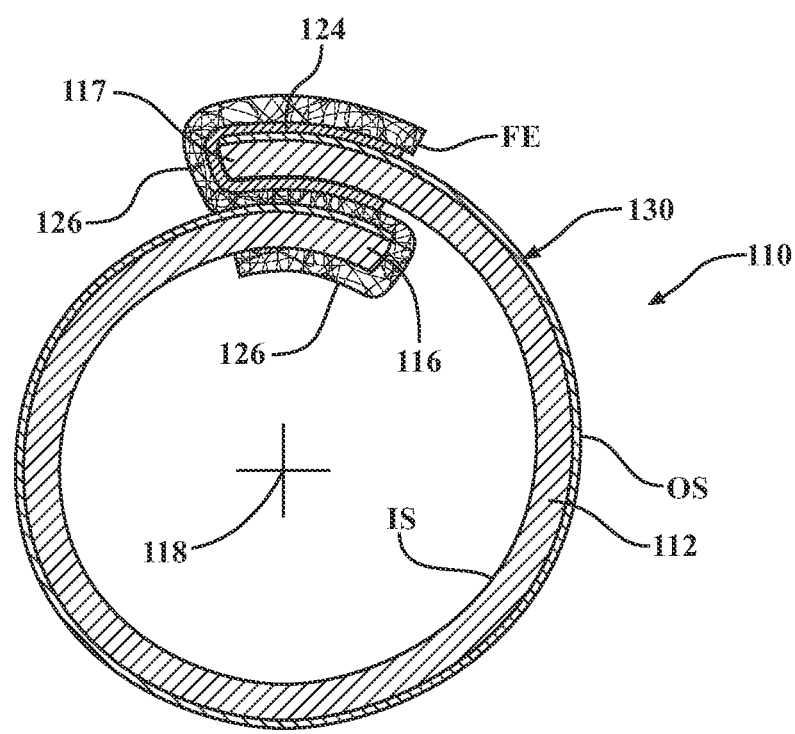
FIG. 6 is an end view of the sleeve of FIG. 4 illustrating opposite edges of a wall of the sleeve in releasably fixed, overlapping relation with one another.

To inhibit unwanted opening of the sleeve 110, and to enhance the prevention of water ingress into the central cavity 120, one of the fastener members, shown as the loop-type fastener member 126, is wrapped about the other of the fastener members, shown as the hook-type fastener member 124. As such, the hook-type fastener member 124 is sandwiched between the loop-type fastener member 126. In particular, the hook-type fastener member 124 is fixed in wrapped relation about the outer edge 117, shown as being fixed to both an inner surface IS of the wall 112 and to an outer surface OS of the wall 112, such as via a stitched yarn, such as a stitched aramid yarn 128 stitched through the wall 112 to fix the hook-type fastener member 124 against both the inner surface IS and the outer surface OS. With the hook-type fastener member 124 being wrapped about the outer edge 117, the hook-type fastener member 124 has a generally U or C-shape as viewed in lateral cross-section taken generally transversely to the central longitudinal axis 118, as shown in FIG. 6. The location of the stitched yarn 128 can be provided as an indicator to an assembler that the sleeve 110 is being properly assembled, namely, that if the stitched yarn 128 is covered by the outer edge 117, as sufficient degree of wrap of the wall 112 has occurred.

The loop-type fastener member 126 is fixed in wrapped relation about the inner edge 116, shown as being fixed to both the inner surface IS of the wall 112 and to the outer surface OS of the wall 112, such as via a stitched yarn, such as a stitched aramid yarn 128 stitched through the wall 112 to fix the loop-type fastener member 126 against both the inner surface IS and the outer surface OS. As shown in FIGS. 5A-5C, a portion of the loop-type fastener 126 extending along the outer surface OS forms a flap portion 126' extending from the stitched yarn 128 to a free edge FE of the loop-type fastener 126. The flap portion 126' extends over the outer surface OS of the wall 112 in detached relation therefrom, thereby being able to be lifted away from the outer surface OS. The flap portion 126' has a sufficient width W so that it can be wrapped over the outer edge 117 and fixed to a portion of the hook-type fastener 124 extending along the outer surface OS of the wall 112. As such, as shown in FIG. 6, the loop-type fastener 126 takes on a generally S-shape, as viewed in lateral cross-section, upon completing assembly of the sleeve 112 about the elongate member 14, thereby enhancing the strength and integrity of fixation and water-tightness between the opposite inner and outer edges 116, 117 without need of supplemental fixation mechanisms, such as tie wraps, adhesives, or otherwise, while allowing the sleeve 110 to be routed about meandering paths, including around corners, without having the opposite edges 116, 117 open relative to one another.

In assembly of sleeve 110, the elongate member is placed to extend lengthwise along the length of the sleeve 110 to extend beyond the opposite ends 119, 121, whereupon the inner edge 116 is wrapped circumferentially into engagement with the elongate member 14, such that the loop-type fastener 126 extending along the inner surface IS of the wall 112 is brought into engagement with the elongate member 14. Then, the outer edge 117 is wrapped circumferentially about the elongate member 14 to bring the hook-type fastener 124 extending along the inner surface IS of the wall 112 into fixed engagement with the loop-type fastener 126 extending along the outer surface OS of the wall 112. At this time, the flap portion 126', that remains extended away from and uncovered by the outer edge 117, is wrapped in reverse folding relation about the outer edge 117 and brought into fixed relation with the hook-type fastener 124 wrapped about the outer edge 117 and with the hook-type fastener 124 extending along the outer surface OS of the wall 112. As such, the outer edge 117, and hook-type fastener 124 wrapped thereabout, is sandwiched between the loop-type fastener 126. Accordingly, the outer edge 117 is reliably fixed against inadvertent separation from the inner edge 116, and a water-tight, serpentine-shaped seal, as viewed in the cross-section of FIG. 6, is formed along the entirety of the length of the overlapped inner and outer edges 116, 117.

In accordance with another aspect of the invention, a method of constructing a textile sleeve 10, 110 is provided. The method includes interlacing (via weaving, braiding or knitting) heat and fire-resistant yarn 22 to form a wall 12, 112 having opposite edges 16, 17; 116, 117 extending lengthwise between opposite ends 19, 21; 119, 121, with the opposite edges 16, 17; 116, 117 being configured to be wrapped about a central longitudinal axis 18, 118 to bound the elongate member 14 within an enclosed cavity 20 of the sleeve 10, 110. Further, fixing at least one heat-resistant hook-type fastener member 24, 124 along one of the opposite edges 17, 117 and at least one heat-resistant loop-type fastener member 26, 126 along the other of the opposite edges 16, 116 wherein the hook-type fastener member 24, 124 and the loop-type fastener member 26, 126 are configured for releasable attachment to one another.

The method can further include providing the hook-type fastener member 24, 124 and the loop-type fastener member 26, 126 being made of aramid and attaching the at least one hook-type fastener member 24, 124 and the at least one loop-type fastener member 26, 128 to the wall 12, 112 with aramid yarn 28, 128, thereby further enhancing the high heat and fire resistance of the sleeve 10, 110.

The method can further include providing an impervious silicone layer coating 30, 130 on an outer surface 32, OS of the wall 12, 112 and on the hook-type fastener member 24, 124 and on the at least one loop-type fastener member 26, 126, thereby further enhancing the water repellency of the sleeve 10, 110.

The method can further include configuring one of the hook-type fastener 124 and the loop-type fastener 126 to be sandwiched between the other of the hook-type fastener 124 and the loop-type fastener 126 to enhance fixation and water-tightness between the fasteners 124, 126.

The method can further include wrapping one of the hook-type fastener 124 and the loop-type fastener 126 about one of the opposite edges 116, 117 and wrapping the other of the hook-type fastener 124 and the loop-type fastener 126 about the other of the opposite edges 116, 117.

The method can further include wrapping the hook-type fastener 124 about an outer one of the opposite edges 117 and wrapping the loop-type fastener 126 about an inner one of the opposite edges 116.

The method can further include providing the loop-type fastener 126 having a flap portion 126' detached from the wall 112, with the flap portion 126' being wrappable about the outer edge 117 into fixed relation with the hook-type fastener 124 extending along an outer surface OS of the wall 112.

The method can further include configuring the loop-type fastener 126 to be fixed to a portion of the hook-type fastener 124 extending along an inner surface IS of the wall 112 and to a portion of the hook-type fastener 124 extending along an outer surface OS of the wall 112.

Obviously, many modifications and variations of the present invention are possible in light of the above teachings. It is contemplated that all features of all claims and of all embodiments can be combined with each other, so long as such combinations would not contradict one another. It is, therefore, to be understood that within the scope of the appended claims, the invention may be practiced otherwise than as specifically described.

What is claimed is:

1. A textile sleeve for routing and protecting an elongate member, comprising:
    a wall having opposite edges extending lengthwise between opposite ends, said opposite edges being configured to be wrapped about a central longitudinal axis to bound the elongate member within an enclosed cavity, said wall being formed of interlaced heat-resistant yarn and having at least one hook fastener member along one of said opposite edges and at least one loop fastener member along the other of said opposite edges, said at least one hook fastener member and said at least one loop fastener member being configured to attach with one another to maintain said opposite edges of said wall in overlapping relation with one another, wherein one of said hook fastener and said loop fastener is sandwiched between the other of said hook fastener and said loop fastener, and wherein one of said hook fastener and said loop fastener is wrapped about one of said opposite edges and the other of said hook fastener and said loop fastener is wrapped about the other of said opposite edges.

2. The textile sleeve of claim 1, wherein said at least one hook fastener member and said at least one loop fastener member are fixed to said wall with aramid yarn.

3. The textile sleeve of claim 1, further comprising a silicone coating on an outer surface of said wall.

4. The textile sleeve of claim 3, further comprising a silicone coating on said at least one hook fastener member and said at least one loop fastener member.

5. The textile sleeve of claim 1, wherein said interlaced heat-resistant yarn is fiberglass yarn.

6. The textile sleeve of claim 1, wherein said interlaced heat-resistant yarns are either woven, braided or knit.

7. The textile sleeve of claim 1, wherein said hook fastener and said loop fastener are formed of aramid.

8. The textile sleeve of claim 1, wherein said hook fastener is wrapped about an outer one of said opposite edges and said loop fastener is wrapped about an inner one of said opposite edges.

9. The textile sleeve of claim 8, wherein said loop fastener has a flap portion detached from said wall, said flap portion being wrappable about said outer edge into fixed relation with said hook fastener.

10. The textile sleeve of claim 9, wherein said loop fastener is fixed to a portion of said hook fastener extending along an inner surface of said wall and to a portion of said hook fastener extending along an outer surface of said wall.

* * * * *